US008600224B2

(12) United States Patent
Clark

(10) Patent No.: US 8,600,224 B2
(45) Date of Patent: Dec. 3, 2013

(54) PHOTOGRAPHIC WIRELESS COMMUNICATION PROTOCOL SYSTEM AND METHOD

(75) Inventor: James E. Clark, South Burlington, VT (US)

(73) Assignee: Lab Partners Associates, Inc., South Burlington, VT (US)

(*) Notice: Subject to any disclaimer, the term of this patent is extended or adjusted under 35 U.S.C. 154(b) by 94 days.

(21) Appl. No.: 13/183,046

(22) Filed: Jul. 14, 2011

(65) Prior Publication Data

US 2012/0181948 A1  Jul. 19, 2012

Related U.S. Application Data

(60) Provisional application No. 61/364,233, filed on Jul. 14, 2010.

(51) Int. Cl.
*G03B 17/00* (2006.01)
*H04B 1/18* (2006.01)

(52) U.S. Cl.
USPC .......................................... 396/56; 455/151.1

(58) Field of Classification Search
USPC ........ 396/56; 348/370; 455/151.5, 352, 151.1
See application file for complete search history.

(56) References Cited

U.S. PATENT DOCUMENTS

| | | |
|---|---|---|
| 3,039,375 A | 6/1962 | Umbach |
| 3,185,056 A | 5/1965 | Gold et al. |
| 3,205,803 A | 9/1965 | Burgarella et al. |
| 3,259,042 A | 7/1966 | Kagan |
| RE26,627 E | 7/1969 | Burgarella et al. |
| 3,659,509 A | 5/1972 | Burgarella |
| 3,728,947 A | 4/1973 | Harnden et al. |
| 3,782,258 A | 1/1974 | Boekkooi et al. |
| 3,810,214 A | 5/1974 | Malone et al. |
| 4,047,191 A | 9/1977 | Coppa et al. |
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |

(Continued)

FOREIGN PATENT DOCUMENTS

| | | |
|---|---|---|
| CA | 2616030 | 1/2013 |
| CN | 2007-80020420.4 | 6/2010 |

(Continued)

OTHER PUBLICATIONS

XE-200 RF Shutter Release for Rebel 2000; http://zenopuseelectronix.com/XE-200.html; last viewed on Sep. 9, 2002.

(Continued)

*Primary Examiner* — Clayton E Laballe
*Assistant Examiner* — Noam Reisner
(74) *Attorney, Agent, or Firm* — Downs Rachlin Martin PLLC

(57) ABSTRACT

A system and method for converting power control value standards during photographic wireless communication from a camera to one or more remote lighting devices. A power control value of a camera may be converted to a different standard for wireless communication and converted to another standard for delivery to a remote lighting device. Different lighting devices may utilize different standards and have conversion to those appropriate standards at the receiver side even where the lighting device standard differs from the camera standard.

76 Claims, 4 Drawing Sheets

(56) References Cited

U.S. PATENT DOCUMENTS

| | | | |
|---|---|---|---|
| 4,351,594 A | 9/1982 | Ishida et al. |
| 4,355,309 A | 10/1982 | Hughey et al. |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,740,804 A | 4/1988 | Shands |
| 4,816,850 A | 3/1989 | Phillipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 * | 6/2002 | Fukui .............................. 396/56 |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,941,067 B2 | 9/2005 | Muramatsu |
| 7,016,603 B2 | 3/2006 | Clark |
| 7,035,534 B2 | 4/2006 | Shih et al. |
| 7,133,607 B2 | 11/2006 | Clark |
| 7,184,658 B2 | 2/2007 | Squillace |
| 7,362,965 B2 | 4/2008 | Clark |
| 7,437,063 B2 | 10/2008 | Clark |
| 7,446,800 B2 | 11/2008 | Holmes |
| 7,463,304 B2 | 12/2008 | Murray |
| 7,684,692 B2 | 3/2010 | Kashiyama |
| 7,702,228 B2 | 4/2010 | Clark |
| 7,714,908 B2 | 5/2010 | Holmes |
| 7,764,875 B2 | 7/2010 | Clark |
| 7,775,575 B2 | 8/2010 | Clark |
| 7,783,188 B2 | 8/2010 | Clark |
| 7,834,894 B2 | 11/2010 | Swanson et al. |
| 7,877,005 B2 | 1/2011 | Okubo |
| 7,880,761 B2 | 2/2011 | Clark |
| 7,885,533 B2 | 2/2011 | Clark |
| 7,965,335 B2 | 6/2011 | Niblock |
| 7,969,504 B2 | 6/2011 | Matsuda et al. |
| 7,970,267 B1 | 6/2011 | Clark |
| 8,116,620 B2 | 2/2012 | King |
| 8,116,621 B2 | 2/2012 | King |
| 8,121,468 B2 | 2/2012 | Clark |
| 8,130,276 B2 | 3/2012 | Holmes |
| 8,134,576 B2 | 3/2012 | Swanson et al. |
| 8,180,210 B2 | 5/2012 | Clark |
| 8,326,136 B1 | 12/2012 | Clark |
| 8,326,140 B2 | 12/2012 | Clark |
| 8,326,141 B1 | 12/2012 | Clark |
| 8,331,776 B2 | 12/2012 | Clark |
| 8,351,774 B2 | 1/2013 | Clark |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0067425 A1 | 6/2002 | Iverson |
| 2002/0067923 A1 | 6/2002 | Fujimura |
| 2003/0128272 A1 | 7/2003 | Clough et al. |
| 2003/0133018 A1 | 7/2003 | Ziemkowski |
| 2003/0193588 A1 | 10/2003 | Yuen et al. |
| 2004/0036774 A1 | 2/2004 | Nichols et al. |
| 2005/0006484 A1 | 1/2005 | Ito |
| 2005/0174434 A1 | 8/2005 | Chang et al. |
| 2006/0014563 A1 | 1/2006 | Cheng |
| 2006/0216009 A1 | 9/2006 | Kawamura |
| 2006/0275024 A1 | 12/2006 | McNary |
| 2006/0291016 A1 | 12/2006 | Ishigami et al. |
| 2008/0180531 A1 * | 7/2008 | Sekiguchi ................ 348/207.2 |
| 2008/0298793 A1 | 12/2008 | Clark |
| 2009/0129765 A1 | 5/2009 | King |
| 2009/0135262 A1 | 5/2009 | Ogasawara |
| 2009/0278479 A1 | 11/2009 | Platner et al. |
| 2009/0310012 A1 | 12/2009 | Ueda et al. |
| 2010/0158494 A1 | 6/2010 | King |
| 2010/0202767 A1 | 8/2010 | Shirakawa |
| 2010/0209089 A1 | 8/2010 | King |
| 2010/0316364 A1 | 12/2010 | Clark |
| 2011/0001665 A1 | 1/2011 | King |
| 2011/0119409 A1 | 5/2011 | King |
| 2011/0123185 A1 | 5/2011 | Clark |
| 2011/0128390 A1 | 6/2011 | Clark |
| 2011/0129207 A1 | 6/2011 | King et al. |
| 2011/0167008 A1 | 7/2011 | King |
| 2012/0027395 A1 | 2/2012 | Clark |
| 2012/0033959 A1 | 2/2012 | King |
| 2012/0044371 A1 | 2/2012 | King |
| 2012/0045193 A1 | 2/2012 | King |
| 2012/0051726 A1 | 3/2012 | King |
| 2012/0099847 A1 | 4/2012 | Clark |
| 2012/0120281 A1 | 5/2012 | Swanson et al. |
| 2012/0127340 A1 | 5/2012 | Holmes |
| 2012/0127361 A1 | 5/2012 | Clark |
| 2012/0140088 A1 | 6/2012 | Clark |
| 2012/0148221 A1 | 6/2012 | Clark |
| 2012/0194699 A1 | 8/2012 | Kouno |
| 2012/0207459 A1 | 8/2012 | Clark |
| 2012/0207460 A1 | 8/2012 | Clark |
| 2012/0243859 A1 | 9/2012 | Clark |
| 2013/0089313 A1 | 4/2013 | Clark |
| 2013/0094845 A1 | 4/2013 | Clark |
| 2013/0100340 A1 | 4/2013 | Clark |

FOREIGN PATENT DOCUMENTS

| | | |
|---|---|---|
| CN | 2010-10600736.4 | 2/2012 |
| CN | 2010-10600736.4 | 12/2012 |
| EP | 0984320 A1 | 3/2000 |
| EP | 07760263.9 | 1/2011 |
| EP | 07760263.9 | 7/2011 |
| EP | 8756458.9 | 7/2011 |
| EP | 11177995.5 | 12/2011 |
| EP | 11177995.5 | 7/2012 |
| EP | 10741797 | 8/2012 |
| EP | 11177995.5 | 8/2012 |
| EP | 11177997.1 | 12/2012 |
| JP | 56-143422 | 11/1981 |
| JP | 59-064821 A | 4/1984 |
| JP | 59-170822 | 9/1984 |
| JP | 63-018874 | 1/1988 |

(56) References Cited

FOREIGN PATENT DOCUMENTS

| JP | 05-093948 | | 4/1993 |
|---|---|---|---|
| JP | 07-159866 | | 6/1995 |
| JP | 2002-244193 | A | 8/2002 |
| JP | 2002-318413 | | 10/2002 |
| JP | 2003-172970 | A | 6/2003 |
| JP | 2003-215672 | A | 7/2003 |
| JP | 2003-325451 | | 11/2003 |
| JP | 2004-072230 | | 3/2004 |
| JP | 2006-149935 | | 6/2006 |
| JP | 2007-067870 | A | 3/2007 |
| KR | 10-0728117 | | 6/2007 |
| WO | 9638925 | A1 | 12/1996 |
| WO | 2007012041 | A2 | 1/2007 |
| WO | 2010093914 | A1 | 8/2010 |
| WO | 2010093927 | A1 | 8/2010 |
| WO | 2010093994 | A1 | 8/2010 |
| WO | 2012009537 | | 1/2012 |
| WO | 2012161772 | A1 | 11/2012 |

OTHER PUBLICATIONS

U.S. Appl. No. 12/705,096, Aug. 8, 2012, Notice of Allowance.
U.S. Appl. No. 12/705,052, Sep. 5, 2012, Notice of Allowance.
U.S. Appl. No. 13/399,333 Sep. 14, 2012, Response to Office Action.
U.S. Appl. No. 13/399,333, Sep. 14, 2012, Terminal Disclaimers.
U.S. Appl. No. 13/438,500, Sep. 14, 2012, Response to Office Action.
U.S. Appl. No. 13/438,500, Sep. 14, 2012, Terminal Disclaimers.
U.S. Appl. No. 12/705,164, Sep. 7, 2012, Office Action.
U.S. Appl. No. 13/399,333, Sep. 28, 2012, Notice of Allowance.
Affadavit of James E. Clark: FlashWizard II Synchronizer, signed Mar. 20, 2008; previously submitted in U.S. Appl. No. 11/697,241.
Analog Devices Technical Data Sheet for ADF7020-1 Transceiver IC, Analog Devices, Inc., 2005, pp. 1-44.
ASH Transceiver Impedance Matching; Document Created on Dec. 10, 2001; pp. 1 to 10; http://www.rfm.com/products/apnotes/antennamatch.pdf; last viewed on Dec. 15, 2005.
Canon EOS 40D Usuer's Manual; about Sep. 2007; Canon Corporation.
Declaration of James E. Clark filed on Feb. 18, 2005 in U.S. Appl. No. 10/306,759.
Ken Rockwell; How to Use Nikon Strobes Wirelessly, for Free!; Dec. 17, 2005; http://web.archive.org/web/20051217091704/http://www.kenrockwell.com/nikon/ittlslave.htm; last viewed at Internet archive on Apr. 1, 2010.
Ken Rockwell: Nikon SU-800 Remote Commander; Nov. 1, 2005, http://www.kenrockwell.com/nikon/su800.htm; last viewed on Jul. 18, 2012.
Nikon D2x; Sep. 2004; pp. 1 to 12; Nikon Corporation.
Nikon WT-1 Transmitter User's Manual; around Dec. 2003; Nikon Corporation.
Nikon WT-2 Article, Part 1; Nikon Corporation; http://nikonimaging.com/global/technology/scene/11/index.htm; last viewed on Mar. 14, 2008.
Nikon WT-2 Article, Part 2: Nikon Corporation; http://nikonimaging.com/global/technology/scene/11/index_02.htm; last viewed on Mar. 14, 2008.
Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.
Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.
Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.
PocketWizard MultiMAX Transceiver New Trigger Control Software Features, by LPA Design, Feb. 10, 2001; pp. 1 to 6, United States.
PocketWizard MultiMAX Transceiver Owner's Manual, by LPA Design, May 2001, pp. 1-55 and "Relay Mode" on p. 40, United States.
Quantum FreeWire Transceiver; Jul. 17, 2005; pp. 1 to 7; http://web.archive.org/web/20050717015832/http://www.qtm.com/wireless/freewire.html; last viewed at Internet Archive on Apr. 25, 2008.
Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Rob Galbraith; Casting Light on the PocketWizard MiniTT1 and FlexTT5; Parts 1 to 5; Feb. 16, 2009; http://www.robgalbraith.com/bins/multi_page.asp?cid=7-9884-9903; last viewed on Jul. 12, 2012.
Robert Hanashiro; Equipment Corner—News & Notes for all Those Gear-Heads; Nov. 26, 2001; pp. 1 to 3; http://www.sportsshooter.com/news_story.html?id=594; last viewed on Septemer, 17, 2002.
Strobist Blog: PocketWizard FlexTT5 and MiniTT1: Full Review; Feb. 16 to 18, 2009; blog comments, pp. 1 to 40; http://strobist.blogspot.com/2009/02/pocketwizard-flextt5-and-minitt1-full.html; last viewed on Feb. 18, 2009.
Strobist Blog: PocketWizard FlexTT5 and MiniTT1: Full Review, Feb. 16, 2009; pp. 1 to 11; http://strobist.blogspot.com/2009/02/pocketwizard-flextt5-and-minitt1-full.html; last viewed on Feb. 18, 2009.
U.S. Appl. No. 10/306,759, Aug. 29, 2003, Office Action, 7,016,603.
U.S. Appl. No. 10/306,759, Dec. 18, 2003, Response to Office Action, 7,016,603.
U.S. Appl. No. 10/306,759, Dec. 24, 2003, Examiner Interview Summary, 7,016,603.
U.S. Appl. No. 10/306,759, Mar. 27, 2004, Final Office Action, 7,016,603.
U.S. Appl. No. 10/306,759, Apr. 15, 2004, Examiner Interview Summary, 7,016,603.
U.S. Appl. No. 10/306,759, Apr. 20, 2004, Response to Final Office Action, 7,016,603.
U.S. Appl. No. 10/306,759, Aug. 24, 2004, Office Action, 7,016,603.
U.S. Appl. No. 10/306,759, Feb. 18, 2005, Request for Continued Examination, 7,016,603.
U.S. Appl. No. 10/306,759, Mar. 29, 2005, Office Action, 7,016,603.
U.S. Appl. No. 10/306,759, Apr. 14, 2005, Response to Office Action, 7,016,603.
U.S. Appl. No. 10/306,759, Jun. 29, 2005, Final Office Action, 7,016,603.
U.S. Appl. No. 10/306,759, Aug. 25, 2005, Response to Final Office Action, 7,016,603.
U.S. Appl. No. 10/306,759, Sep. 16, 2005, Notice of Allowance, 7,016,603.
U.S. Appl. No. 10/306,759, Oct. 18, 2005, 312 Amendment, 7,016,603.
U.S. Appl. No. 10/306,759, Dec. 20, 2005, Response to 312 Amendment, 7,016,603.
U.S. Appl. No. 10/306,759, Jan. 4, 2006, Response to 312 Amendment, 7,016,603.
U.S. Appl. No. 10/306,759, Nov. 18, 2006, Certificate of Correction, 7,016,603.
U.S. Appl. No. 11/305,668, Mar. 8, 2006, Office Action, 7,133,607.
U.S. Appl. No. 11/305,668, Jun. 8, 2006, Response to Office Action, 7,133,607.
U.S. Appl. No. 11/305,668, Jun. 13, 2006, Supplemental Response to Request for Clarification by the Examiner 7,133,607.
U.S. Appl. No. 11/305,668, Jun. 30, 2006, Notice of Allowance, 7,133,607.
U.S. Appl. No. 11/305,668, Mar. 29, 2007, Request for Correction of Letters Patent, 7,133,607.
U.S. Appl. No. 11/529,203, Aug. 14, 2007, Office Action, 7,362,965.
U.S. Appl. No. 11/529,203, Oct. 16, 2007, Terminal Disclaimer, 7,362,965.
U.S. Appl. No. 11/529,203, Oct. 16, 2007, Response to Office Action, 7,362,965.
U.S. Appl. No. 11/529,203, Oct. 25, 2007, Terminal Disclaimer, 7,362,965.

(56) References Cited

OTHER PUBLICATIONS

U.S. Appl. No. 11/529,203, Dec. 14, 2007, Notice of Allowance, 7,362,965.
U.S. Appl. No. 12/104,950, Dec. 31, 2009, Office Action, 7,764,875.
U.S. Appl. No. 12/104,950, Feb. 1, 2010, Response to Office Action, 7,764,875.
U.S. Appl. No. 12/104,950, Mar. 23, 2010, Notice of Allowance, 7,764,875.
U.S. Appl. No. 12/843,254, Jul. 27, 2010, Preliminary Remarks, 8,121,468.
U.S. Appl. No. 12/843,254, Aug. 25, 2011, Office Action, 8,121,468.
U.S. Appl. No. 12/843,254, Aug. 25, 2011, Response to Office Action, 8,121,468.
U.S. Appl. No. 12/843,254, Aug. 25, 2011, Terminal Disclaimer, 8,121,468.
U.S. Appl. No. 12/843,254, Nov. 28, 2011, Notice of Allowance, 8,121,468.
U.S. Appl. No. 13/399,333, Jun. 14, 2012, Office Action.
U.S. Appl. No. 11/488,491, Oct. 16, 2007, Office Action.
U.S. Appl. No. 11/490,322, Apr. 20, 2010, Office Action, 7,880,761.
U.S. Appl. No. 11/490,322, Jul. 12, 2010, Response to Office Action, 7,880,761.
U.S. Appl. No. 11/490,322, Sep. 15, 2010, Notice of Allowance, 7,880,761.
U.S. Appl. No. 11/697,241, Nov. 8, 2007, Office Action, 7,437,063.
U.S. Appl. No. 11/697,241, Mar. 10, 2008, Response to Office Action, 7,437,063.
U.S. Appl. No. 11/697,241, Mar. 24, 2008, Examiner Interview Summary, 7,437,063.
U.S. Appl. No. 11/697,241, Jun. 9, 2008, Notice of Allowance, 7,437,063.
U.S. Appl. No. 12/250,914, Jun. 12, 2009, Office Action, 7,702,228.
U.S. Appl. No. 12/250,914, Jun. 29, 2009, Response to Office Action and Terminal Disclaimer, 7,702,228.
U.S. Appl. No. 12/250,914, Oct. 28, 2009, Terminal Disclaimer, 7,702,228.
U.S. Appl. No. 12/250,914, Dec. 3, 2009, Notice of Allowance, 7,702,228.
U.S. Appl. No. 12/762,811, Dec. 28, 2010, Office Action, 7,970,267.
U.S. Appl. No. 12/762,811, Mar. 28, 2011, Response to Office Action, 7,970,267.
U.S. Appl. No. 12/762,811, Mar. 28, 2011, Terminal Disclaimer, 7,970,267.
U.S. Appl. No. 12/762,811, Apr. 20, 2011, Notice of Allowance, 7,970,267.
U.S. Appl. No. 13/169,413, Dec. 20, 2011, Office Action, 8,180,210.
U.S. Appl. No. 13/169,413, Jan. 16, 2012, Response to Office Action, 8,180,210.
U.S. Appl. No. 13/169,413, Jan. 16, 2012, Terminal Disclaimers, 8,180,210.
U.S. Appl. No. 13/169,413, Mar. 22, 2012, Notice of Allowance, 8,180,210.
U.S. Appl. No. 13/438,500, Jun. 18, 2012, Office Action.
U.S. Appl. No. 12/129,447, Apr. 12, 2010, Notice of Allowance, 7,775,575.
U.S. Appl. No. 12/129,447, Apr. 12, 2010, Examiner Amendment, 7,775,575.
U.S. Appl. No. 12/129,402, Apr. 19, 2010, Notice of Allowance, 7,783,188.
U.S. Appl. No. 12/861,445, Sep. 30, 2010, Notice of Allowance, 7,885,533.
U.S. Appl. No. 13/021,951, Nov. 25, 2011, Notice of Allowance.
U.S. Appl. No. 13/021,951, Feb. 13, 2012, Withdrawal of Notice of Allowance.
U.S. Appl. No. 13/021,951, Feb. 22, 2012, Office Action.
U.S. Appl. No. 13/253,596, Nov. 30, 2011, Office Action.
U.S. Appl. No. 13/253,596, Feb. 29, 2012, Response to Office Action.
U.S. Appl. No. 13/253,596, May 9, 2012, Final Office Action.
U.S. Appl. No. 12/705,052, Mar. 27, 2012, Office Action.
U.S. Appl. No. 12/705,052, Jun. 27, 2012, Response to Office Action.
U.S. Appl. No. 12/705,096, Mar. 12, 2012, Office Action.
U.S. Appl. No. 12/705,096, Jun. 12, 2012, Response to Office Action.
U.S. Appl. No. 12/705,164, Mar. 29, 2012, Office Action.
U.S. Appl. No. 12/705,164, Jun. 29, 2012, Response to Office Action.
PCT/US2003/37271, WO, May 12, 2004, International Search Report.
PCT/US2006/028229, WO, Feb. 12, 2008, International Search Report and Written Opinion.
PCT/US2007/066162, WO, Nov. 9, 2007, International Search Report and Written Opinion.
PCT/US2008/065139, WO, Sep. 25, 2008, International Search Report and Written Opinion.
PCT/US2008/065137, WO, Sep. 25, 2008, International Search Report and Written Opinion.
PCT/US2010/024108, WO, Sep. 2, 2010, International Search Report and Written Opion.
PCT/US2010/024195, WO, Sep. 16, 2010, International Search Report and Written Opinion.
PCT/US2010/024088, WO, Jul. 16, 2010, International Search Report and Written Opinion.
PCT/US2012/025915, WO, Jun. 8, 2012, International Search Report and Written Opinion.
PCT/US2011/044008, WO, Nov. 17, 2011, International Search Report and Written Opinion.
U.S. Appl. No. 10/306,759, filed Nov. 26, 2002, 7,016,603.
U.S. Appl. No. 11/305,668, filed Dec. 16, 2005, 7,133,607.
U.S. Appl. No. 11/529,203, filed Sep. 27, 2006, 7,362,965.
U.S. Appl. No. 12/104,950, filed Apr. 17, 2008, 7,764,875.
U.S. Appl. No. 12/843,254, filed Jul. 26, 2010, 8,121,468.
U.S. Appl. No. 13/399,333, filed Feb. 17, 2012.
U.S. Appl. No. 11/490,322, filed Jul. 20, 2006, 7,880,761.
U.S. Appl. No. 13/016,345, filed Jan. 28, 2011.
U.S. Appl. No. 11/697,241, filed Apr. 5, 2007, 7,437,063.
U.S. Appl. No. 12/250,914, filed Oct. 14, 2008, 7,702,228.
U.S. Appl. No. 12/762,811, filed Apr. 19, 2010, 7,970,267.
U.S. Appl. No. 13/169,413, filed Jun. 27, 2011, 8,180,210.
U.S. Appl. No. 13/438,500, filed Apr. 3, 2012.
U.S. Appl. No. 12/129,447, filed May 29, 2008, 7,775,575.
U.S. Appl. No. 12/129,402, filed May 29, 2008, 7,783,188.
U.S. Appl. No. 12/861,445, filed Aug. 23, 2010, 7,885,533.
U.S. Appl. No. 13/021,951, filed Feb. 7, 2011.
U.S. Appl. No. 13/253,596, filed Oct. 5, 2011.
U.S. Appl. No. 13/201,182, filed Aug. 11, 2011.
U.S. Appl. No. 13/201,185, filed Aug. 11, 2011.
U.S. Appl. No. 13/201,281, filed Aug. 12, 2011.
U.S. Appl. No. 13/208,686, filed Aug. 12, 2011.
U.S. Appl. No. 13/208,706, filed Aug. 12, 2011.
U.S. Appl. No. 13/401,175, filed Feb. 21, 2012.
U.S. Appl. No. 12/705,052, filed Feb. 12, 2010.
U.S. Appl. No. 12/705,096, filed Feb. 12, 2010.
U.S. Appl. No. 12/705,164, filed Feb. 12, 2010.
International Search Report and Written Opinion dated Nov. 17, 2011 in related International Application No. PCT/US2011/044008 filed Jul. 14, 2011.
U.S. Appl. No. 12/705,164, Nov. 29, 2012, RCE.
U.S. Appl. No. 13/208,706, Dec. 26, 2012, Office Action.
U.S. Appl. No. 13/208,686, Feb. 6, 2013, Office Action.
U.S. Appl. No. 13/183,046, Feb. 13, 2013, Office Action.
U.S. Appl. No. 13/708,326, filed Dec. 7, 2012.
U.S. Appl. No. 13/692,515, filed Dec. 3, 2012.
U.S. Appl. No. 13/692,550, filed Dec. 3, 2012.
U.S. Appl. No. 13/735,325, filed Jan. 7, 2013.
U.S. Appl. No. 13/735,325, Mar. 15, 2013, Office Action.
U.S. Appl. No. 13/735,325, Mar. 21, 2013, Response to Office Action w/ Terminal Disclaimers.
U.S. Appl. No. 13/708,326, Mar. 26, 2013, Notice of Allowance.
U.S. Appl. No. 13/208,706, Mar. 26, 2013, Response to Office Action.
U.S. Appl. No. 13/016,345, Apr. 26, 2013, Restriction Requirement.

* cited by examiner

PHOTOGRAPHIC WIRELESS COMMUNICATION PROTOCOL SYSTEM AND METHOD

RELATED APPLICATION DATA

This application claims the benefit of priority of U.S. Provisional Patent Application Ser. No. 61/364,233, filed Jul. 14, 2010, and titled "Photographic Wireless Communication Protocol System and Method," which is incorporated by reference herein in its entirety.

FIELD OF THE INVENTION

The present invention generally relates to the field of photographic lighting output control. In particular, the present invention is directed to a photographic wireless communication protocol system and method.

SUMMARY OF THE INVENTION

In one implementation, the present disclosure includes a method of wirelessly communicating a photographic lighting power control value from a camera to one or more remote lighting devices. The method includes receiving a first lighting power control value based on a first standard at a first wireless communication functionality associated with a camera; converting the first lighting power control value to a second lighting power control value based on a second standard; wirelessly communicating the second lighting power control value from the first wireless communication functionality to a second wireless communication functionality associated with a first remote lighting device; converting the second lighting power control value to a third lighting power control value based on a third standard that is compatible with the power control of the first remote lighting device; and delivering the third lighting power control value to a power control processing element of the first remote lighting device.

In another implementation, the present disclosure includes a method of wirelessly communicating a photographic lighting power control value from a camera to one or more remote lighting devices. The method includes receiving a first lighting power control value based on a first standard at a first wireless communication functionality associated with a camera; converting the first lighting power control value to a second lighting power control value based on a second standard that is different from the first standard; wirelessly communicating the second lighting power control value from the first wireless communication functionality to a second wireless communication functionality associated with a first remote lighting device; converting the second lighting power control value to a third lighting power control value based on a third standard that is compatible with the power control of the first remote lighting device; delivering the third lighting power control value to a power control processing element of the first remote lighting device; wirelessly receiving the second lighting power control value at a third wireless communication functionality associated with a second remote lighting device; converting the second lighting power control value to a fourth lighting power control value based on a fourth standard that is compatible with the power control of the second remote lighting device, wherein the fourth standard is different from the third standard; and delivering the fourth lighting power control value to a power control processing element of the second remote lighting device.

In yet another implementation, the present disclosure includes a photographic wireless communication system. The system includes a transmitting wireless communication functionality associated with a camera including: a memory including information for converting a first power control value standard of the camera to a second power control value standard for wireless communication to one or more remote lighting devices; a processing element for receiving a first power control value based on the first power control value standard from the camera and using information from the memory to convert the first power control value to a second power control value based on the second power control value; and a wireless communication circuitry configured to wirelessly communicate the second power control value; and a first receiving wireless communication functionality associated with a first remote lighting device including: a wireless communication circuitry configured to wirelessly receive the second power control value; a memory including information for converting the second power control value standard to a third power control value standard compatible with the first remote lighting device; a connection to the power control circuitry of the first remote lighting device; and a processing element for receiving the second power control value from the wireless communication circuitry, converting the second power control value to a third power control value based on the third power control value standard, and delivering the third power control value to the power control circuitry via the connection.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
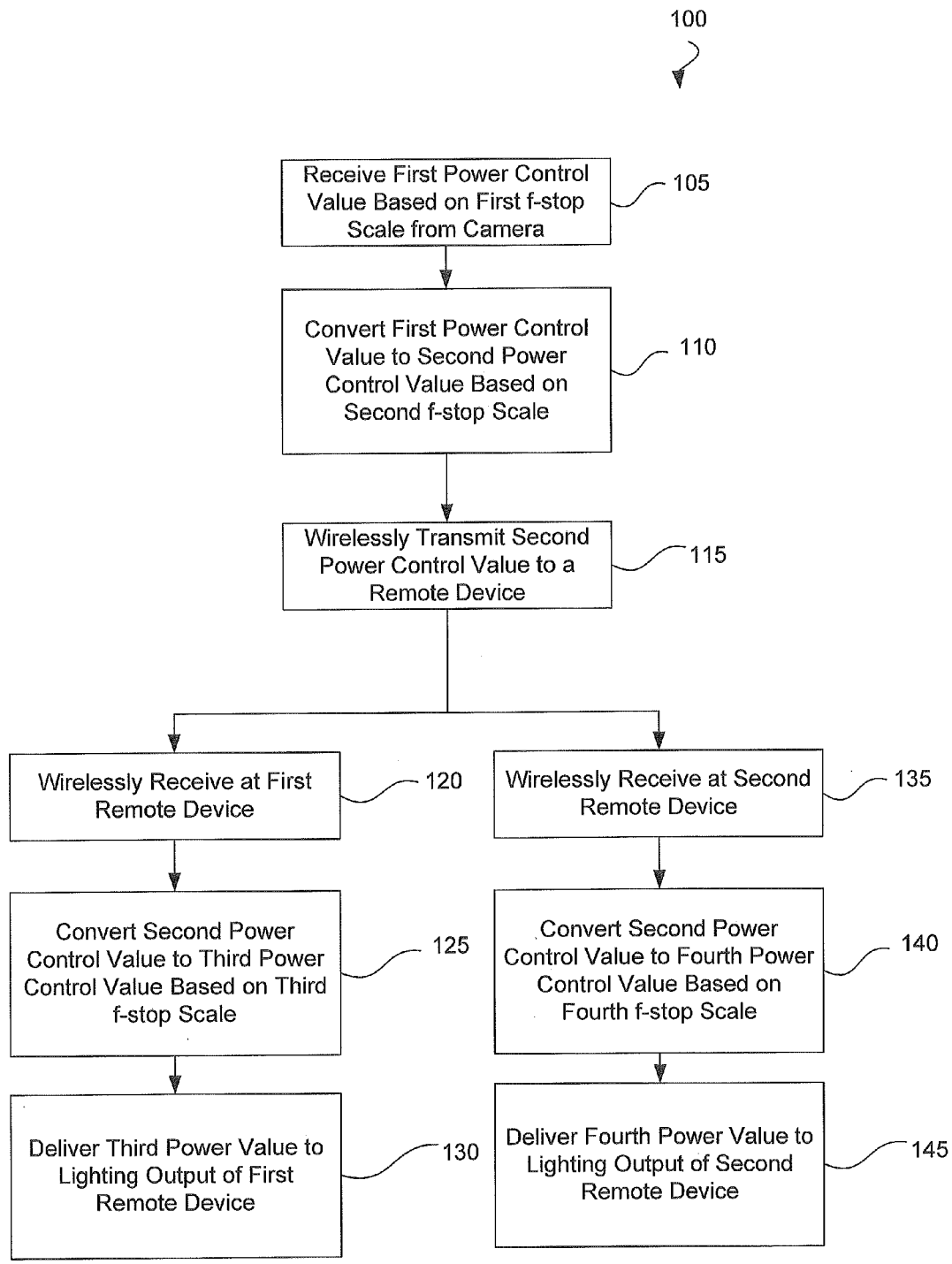
FIG. 1 illustrates an exemplary implementation of a method for wirelessly communicating photographic lighting power control to one or more remote lighting devices.

A method and system for wirelessly communicating a photographic lighting power control value (e.g., light output level, light emission duration, and combinations thereof) from a camera to one or more remote lighting devices is provided. In one exemplary implementation, a method includes receiving a first lighting power control value based on a first standard at a first wireless communication functionality associated with a camera; converting the first lighting power control value to a second lighting power control value based on a second standard; wirelessly communicating the second lighting power control value from the first wireless communication functionality to a second wireless communication functionality associated with a first remote lighting device; converting the second lighting power control value to a third lighting power control value based on a third standard that is compatible with the power control of the first remote lighting device; and delivering the third lighting power control value to a power control processing element of the first remote lighting device. Any combination of the first, second, and third standards may be the same standard. In such an example, a conversion from one like standard to another like standard may include no change in the lighting power control value (e.g., a recognition may occur by a control element of a wireless communication functionality that the starting lighting power control value is based on the same standard as the desired standard of the lighting power control value to which it is to be converted).

Cameras and photographic lighting devices may utilize different standards as the basis for calculating and transmitting power control values used to set the emission output level and/or emission output duration of a photographic lighting device. Example standards include, but are not limited to, power output level scaling, power output level direct mapping (e.g., via a table), emission output duration scaling, emission output duration direct mapping (e.g., via a table), and any combinations thereof. In one example, different power control value standards may utilize different power output scaling intervals and/or offsets. In one such example, a camera may utilize a different f-stop power scale having a different interval between integer data values than that of a lighting device to be controlled. In another example, a camera and a lighting device to be controlled may utilize the same f-stop power scale. In such an example, a wireless communication functionality may still convert to a different standard for wireless communication and then convert back. In another such example, a camera and a lighting device to be controlled may utilize different f-stop power scales and a wireless communication functionality may convert to a third f-stop power scale (e.g., one that is different from both the camera and the lighting device, one that is the same as one of the camera and the lighting device) for wireless communication from the camera to the lighting device. While throughout this disclosure f-stop power output scaling examples are utilized to describe aspects and embodiments of the present disclosure, it is contemplated that the aspects and embodiments apply to other power control value standards. For example, a camera-side power control value may be based on a standard that is an index (e.g., a look up table) of power values, f-stop values, and/or other power control values. In one example, a lookup table based standard may be utilized to represent non-linear functions that are difficult to scale and/or offset with simple math. In one such example, a camera and/or a lighting device may include information (e.g., in a table) needed to get a proper exposure at all points within a dynamic range of a lighting device and a camera.

In one exemplary aspect, a power control value of a camera that is based on a first f-stop power scale is converted to a power control value based on a second f-stop power scale for wireless transmission to one or more remote devices. At the remote device side, the transmitted and received power control value is converted to a power control value that is based on an f-stop power scale that is consistent with the f-stop power scale of the remote lighting device receiving the power control value. Power scaling that is based on photographic f-stops are used to exemplify concepts of the present disclosure. It is contemplated that photographic lighting power control values based on different standards (e.g., intervals and/or different systems) may be utilized in place of and/or in addition to those based on f-stop scaling intervals. For example, data values from a camera for power output levels and/or light emission duration may correspond to specific known power output levels and/or light emission durations that do not follow a particular scaling. In such a case, a cross-over table may be utilized to assist in correlating values from the camera (e.g., hexadecimal, binary data) to power output levels (e.g., watt*second) and/or light emission duration (e.g., microsecond, millisecond).

In one exemplary aspect, example implementations of a system and/or method according to the present disclosure may allow the use of lighting equipment that has power scaling (e.g., f-stop intervals for power settings) that differs from the associated camera body. For example, a Nikon camera body having power values that are based on integer step intervals of $1/12$ f-stops can be used with a Speedlite from Canon that utilizes power values based on intervals of $1/8$ f-stops. In another exemplary aspect, example implementations of a system and/or method according to the present disclosure may allow the use of multiple lighting equipment devices having different power scaling intervals with a single camera (e.g., a Canon camera having power settings based on intervals of $1/8$ f-stops may utilize both a Canon Speedlite having power settings based on intervals of $1/8$ f-stops and a Nikon Speedlite having powers settings based on intervals of $1/12$ f-stops). In yet another exemplary aspect, example implementations of a system and/or method according to the present disclosure may allow TTL ("through the lens") lighting power setting of photographic lighting equipment that has power scaling that differs from the associated camera body. Other benefits and advantages may also be present in one or more exemplary implementations of the concepts disclosed herein.

FIG. 1 illustrates one exemplary implementation of a method 100 for wirelessly communicating photographic lighting power control to one or more remote lighting devices.

Figure 3:
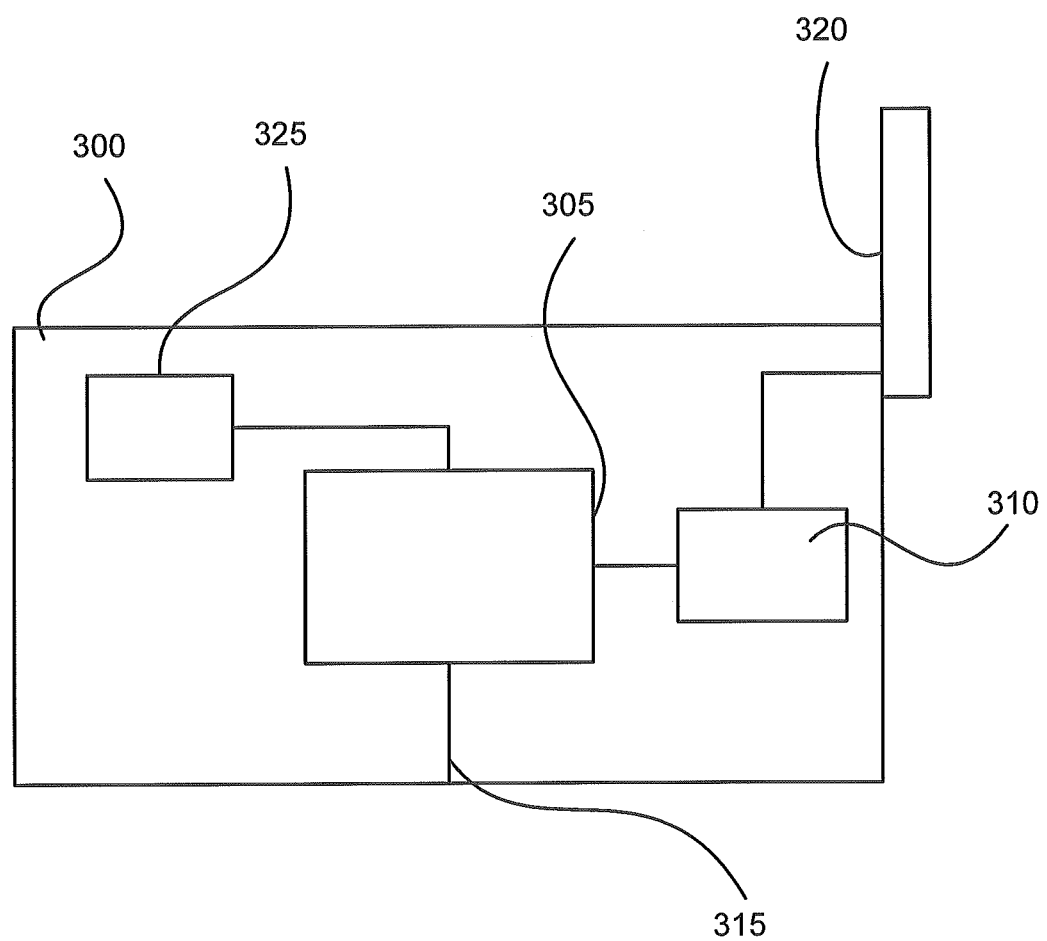
FIG. 3 illustrates an exemplary implementation of a wireless functionality.

At step 105, a power control value that is based on a first f-stop scale is received from a camera for wireless communication to one or more remote devices. Example remote photographic lighting devices include, but are not limited to, a continuous lighting device, a flash lighting device (e.g., a studio strobe light, a Speedlite), and any combinations thereof. In one exemplary aspect, the receiving of a power control value from a camera may occur via a wireless communication functionality (e.g., a functionality internal to a camera body, a functionality external to a camera body). FIG. 3, which is discussed further below, illustrates one exemplary implementation of a wireless communication functionality. A wireless communication functionality typically includes a wireless communication circuit (e.g., a transceiver, a transmitter, a receiver) associated with a processing element. The processing element of a wireless communication circuit may be shared with other aspects of an external device or the internal circuitry of a camera (e.g., the processing element that controls a camera's general operation may also control all or part of the wireless communication circuit). Receiving of a power control value by a wireless communication functionality may include, but is not limited to, receiving data via a wired connection internal to a camera body (e.g., where the wireless communication functionality includes one or more components internal to the camera body), receiving data via a wired connection between a camera body and an external wireless communication functionality (e.g., a hot-shoe connection, a wired connection between a port of the camera and a port of the wireless communication functionality, and any combinations thereof. As discussed herein, one or more components (e.g., processing element, memory, etc) of a camera and one or more components of a wireless communication functionality (e.g., processing element, memory, etc.) may be shared between the camera and the wireless communication functionality such that receipt and conversion (as discussed further below) of a power control value may occur in one or more of these shared components.

Figure 2:
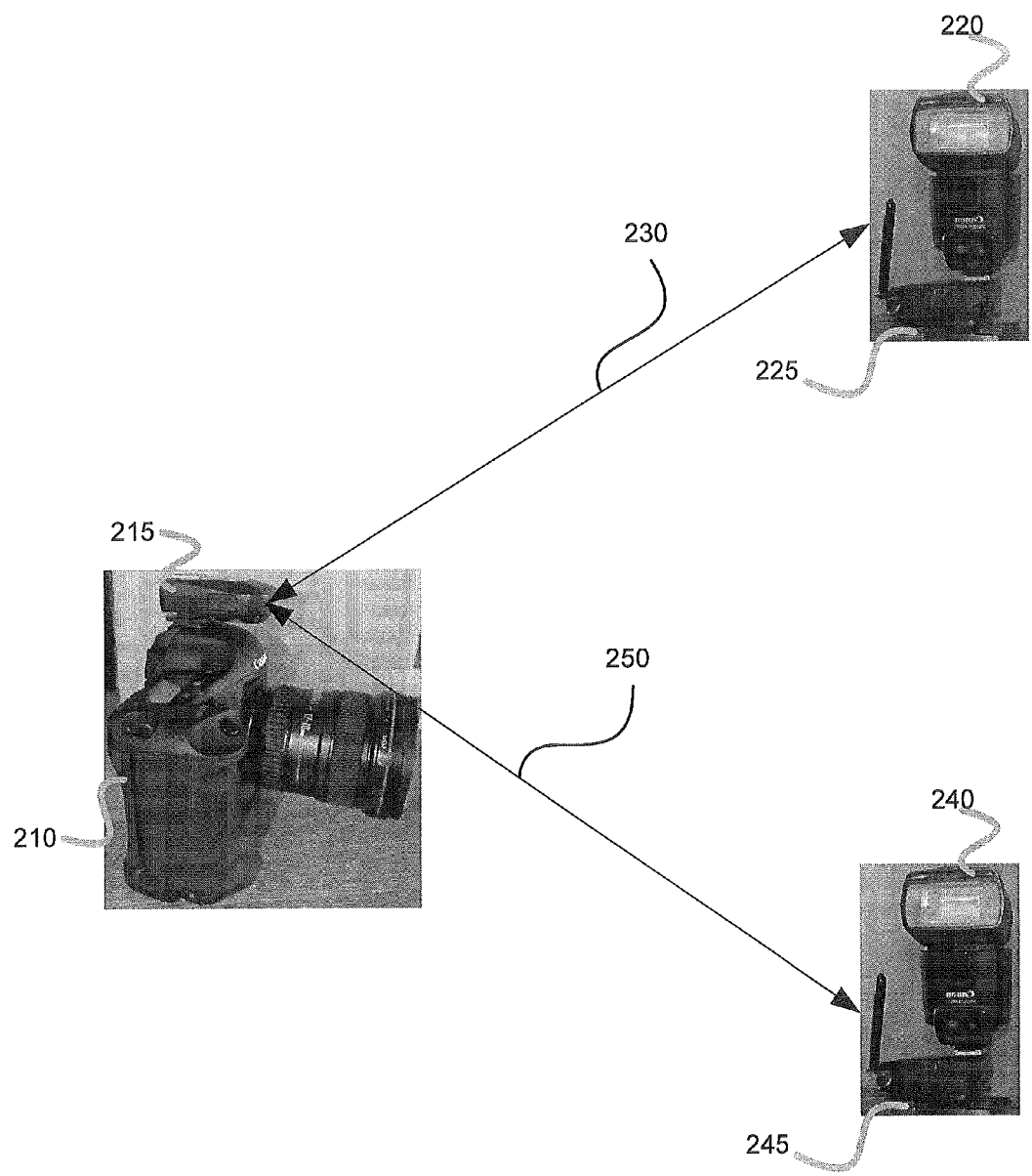
FIG. 2 illustrates an exemplary implementation of a photographic environment.

FIG. 2 illustrates one exemplary photographic environment including a camera 210, an external wireless communication functionality 215, a remote lighting device 220 associated with an external wireless communication functionality 225 for receiving a wireless signal 230 from wireless communication functionality 215, and a remote lighting device 240 associated with an external wireless communication functionality 245 for receiving a wireless signal 250 from wireless communication functionality 215. Although wireless communication functionalities 215, 225, 245 are shown externally, it is contemplated that all or a portion of each of one or more of wireless communication functionalities 215, 225, 245 may be internal to camera 210, lighting device 220, and lighting device 240, respectively. Wireless communication functionalities 215, 225, 245 are shown connected to their respective devices via hot shoe connectors. Other wired and wireless connections between a camera/lighting device and an external wireless communication functionality are contemplated. Example connections include, but are not limited to, a wired connection to a port of the camera that provides power control value data, a wired connection to a port of a lighting device that receives power control value data, a short-range wireless connection (e.g., Bluetooth) from the camera/lighting device to the external wireless communication functionality, and any combinations thereof.

In one exemplary implementation of method 100 using camera 210, a power control value based on the f-stop scale utilized by camera 210 is received by wireless communication functionality 215 via the hot shoe connection. In one example, the power control value is a power control value based on a TTL lighting power setting from the camera body 210. In another example, the power control value is a power control value that is manually set using one or more input devices of camera 210. In another example, the power control value is a power control value that is manually set using one or more input devices of wireless communication functionality 215. In yet another example, the power control value is a power control value that is manually set using one or more input devices of a lighting device that is connected to camera 210 (e.g., a Speedlite connected to a hotshoe of camera 210, such as when wireless communication functionality is internal to camera body 210 and/or when wireless communication functionality includes a plurality of hot shoe connectors that allow connection to the camera body and to a Speedlite simultaneously). Example input devices include, but are not limited to, a button, a dial, a touch screen, a display screen, and any combinations thereof.

At step 110, the power control value that is received by the camera-side wireless communication functionality is converted to a second power control value based on a second f-stop scale for wireless communication. In one exemplary aspect, wireless communication functionalities 215, 225, 245 may be configured to communicate using a power control value that is based on a power interval scaling that differs from a camera and/or a lighting device to which they are connected. Wireless communication functionality 215 may utilize information about the identity of camera 210 (e.g., manufacturer and/or model) to know the power value scaling intervals and/or power value offsets that are utilized by camera 210. In one example, a camera may utilize f-stop power values based on a scale that has intervals at ⅛ f-stops. In another example, a camera may utilize f-stop power values based on a scale that has intervals at 1/10 f-stops. In yet another example, a camera may utilize f-stop power values based on a scale that has intervals at ⅙ f-stops. In still another example, a camera may utilize f-stop power values based on a scale that has intervals at 1/12 f-stops.

Data values representing a power value may be in any format that can convey the information of a power output setting for a photographic lighting device. In one example, power values may be on a data scale of 0 to 255. Example data scales using data values of 0 to 255 are discussed further below with respect to FIG. 4. One or more of the data values in a power value scale, such as a first data value (e.g., data value 0) in a scale, may be calibrated to a certain power output. For example, a data value in a scale may be calibrated to a predetermined watts second output of light from a lighting device. In one such example, a wireless communication functionality associated with a camera may also know this value and utilize an offset to account for this starting value of the scale. In another example, a data value of a scale may be calibrated to the maximum power output of a lighting device. In one such example, data values on the scale may represent f-stop increments down in power output from the maximum power output of a lighting device.

A wireless communication functionality can determine the scaling and/or offset of power values from a camera in a variety of ways. Example ways to determine the scaling and/or offset of power values include, but are not limited to, being programmed to work with a specific camera scaling (e.g., where the wireless communication functionality is internal to the camera body), knowing the camera make (e.g., Canon, Nikon, Sony, etc.) by predetermined connection limitation (e.g., an external functionality having a manufacturer specific hot shoe connection and related programming), detecting the camera make via an external connection (e.g., a hot shoe connection and/or another connection), detecting the camera model via an external connection (e.g., a hot shoe connection and/or another connection), detecting the camera model and/or make internally to the camera body, use of a cross-over table, and any combinations thereof. In one example, an external wireless communication functionality receives data representing the camera model from a camera body via a hot shoe connection and utilizes a table stored in a memory to determine the scaling and/or offsets of power values from the camera.

The wireless communication functionality may utilize any power scaling intervals to convert to for wireless communication to remote devices. In one example, a power control value of a camera is converted to a power control value based on a scaling having intervals at 1/10 f-stops.

At step 115, the converted power control value based on the f-stop interval scaling of the wireless communication functionality is wirelessly transmitted to one or more remote devices. Wireless protocols and technologies are known. Example wireless technologies include, but are not limited to, radio frequency (RF), optical (e.g., infrared), and any combinations thereof.

At step 120, the converted power control value is wirelessly received at a first remote device. A remote device may utilize a wireless communication functionality associated with the remote device to receive the converted power control value. Exemplary aspects of a wireless communication functionality are discussed above with respect to the transmitting wireless functionality and an example functionality is described further below with respect to FIG. 3. In one example, a wireless communication functionality is internal to the remote lighting device. In another example, a wireless communication functionality is external to the remote lighting device. In yet another example, a wireless communication functionality includes one or more components external to the remote lighting device and one or more components internal to the remote lighting device.

At step 125, the received power control value is converted to a power control value that is based on a power control scaling (e.g., an f-stop interval scaling) that is the scaling that is compatible with the lighting device receiving the power control value. In one example, the power value scaling interval of the sending camera and the receiving lighting device are the same scaling. In another example, the power value scaling interval of the sending camera and the receiving lighting device are different scaling (e.g., where the camera and the lighting device are made by different manufacturers).

Wireless communication functionality can determine the scaling and/or offset of power values corresponding to an associated lighting device in a variety of ways. Example ways to determine the scaling and/or offset of power values include, but are not limited to, being programmed to work with a specific lighting device scaling (e.g., where the wireless communication functionality is internal to the lighting device), knowing the lighting device make (e.g., Canon, Nikon, Sony, etc.) by predetermined connection limitation (e.g., an external functionality having a manufacturer specific hot shoe connection and related programming), detecting the lighting device make via an external connection (e.g., a hot shoe connection and/or another connection), detecting the lighting device model via an external connection (e.g., a hot shoe connection and/or another connection), detecting the lighting device model and/or make internally to the lighting device body, use of a cross-over table, and any combinations thereof. In one example, an external wireless communication functionality receives data representing the lighting device model from a lighting device body via a hot shoe connection and utilizes a table stored in a memory to determine the scaling and/or offsets of power values for use by the lighting device. In one such example, the wireless communication functionality may receive data from the lighting device at a time prior to the transmission of the power control value from the camera (e.g., at power on of the device, at a previous transmission, etc.).

At step 130, the power control value now converted to the scaling of the lighting device is provided to the lighting output controller of the lighting device. The lighting device may then use the power control value to set the power output level of the light for one or more subsequent light output events (e.g., in conjunction with an image acquisition of the camera). In one example, where the camera is operating in TTL mode, the lighting device may emit a lighting event and the camera utilizes the lighting information to modify the desired light output by sending a new power control value (e.g., as in steps 105 to 130). In another example, where the power output of the light is being manually set, a user of the camera may utilize the light emission output and make adjustments at the camera side (e.g., via the camera, the wireless communication functionality, and/or an attached lighting device) to a desired power output. A new value may be subsequently sent to one or more remote devices (e.g., via steps 105 to 130).

At optional step 135, the power control value transmitted by the wireless communication functionality associated with the camera is received by another remote lighting device (e.g., via a wireless communication functionality as described above with respect to steps 120 to 130). At step 140, the received power control value is converted to a power control value that is based on a power control scaling that is compatible with the lighting device receiving the power control value. The power control scaling of this lighting device may be different from one or more of any other lighting device receiving the power control value from the camera. In one such example, a camera from one manufacturer having a first power control scaling interval to its power settings may control the power output (e.g., using TTL) of a remote lighting device of the same manufacturer and also control the power output (e.g., using TTL) of a remote lighting device of a different manufacturer.

At step 145, the power control value now converted to the scaling of the lighting device is provided to the lighting output controller of the lighting device. The lighting device may then use the power control value to set the power output level of the light for one or more subsequent light emissions.

FIG. 3 illustrates one exemplary embodiment of a wireless functionality 300. Wireless functionality 300 includes a processing element 305 connected to a wireless communication circuitry 310. Processing element 305 may include one or more processing circuits. Example processing circuits include, but are not limited to, a microprocessor, and any combinations thereof. Example microprocessors include, but are not limited to, AT90USB 1287, Texas Instruments CC1110, and any combinations thereof. Wireless communication circuitry 310 may include one or more wireless communication circuits. Example wireless communication circuits include, but are not limited to, a transmitter, a receiver, a transceiver, and any combinations thereof. In one example, wireless communication circuitry 310 includes a radio frequency wireless circuitry. Examples of a radio frequency circuitry include, but are not limited to, is ATMega168 model processor available from Atmel of San Jose, Calif.; ChipCon CC1110 (by Texas Instruments) CPU and transceiver all in one chip; and any combinations thereof. Processing element 305 and wireless communication circuitry 310 are illustrated in this example as separate elements. It is contemplated that one or more of the components of each of processing element 305 and wireless communication circuitry 310 may be included in a single element. For example, a wireless functionality 300 may include an integrated circuit that includes a wireless communication circuit and a processing element. In another exemplary aspect, one or more aspects of processing element 305 may be shared with a processing element of a camera, a lighting device, or another device associated with the wireless communication functionality.

Wireless functionality 300 includes an antenna 320 in electrical communication with wireless communication circuitry 310. Antenna 320 may be positioned to assist in transmitting and/or receiving wireless signals. In one example, all or part of antenna 320 is external to a wireless functionality device (e.g., a device that is external to a camera, a device that is internal to a camera, a device that is external to a lighting device, a device that is internal to a lighting device). In another example, antenna 320 is internal to a wireless functionality device that is (e.g., a device that is external to a camera, a device that is internal to a camera, a device that is external to a lighting device, a device that is internal to a lighting device).

Wireless functionality 300 includes a memory element 325 in electrical connection with processing element 305. Memory element 325 may include one or more memory devices. Example memory devices include, but are not limited to, a solid state memory, a flash memory, a removable memory, an optical memory element (e.g., an optical disk and/or optical disk device), a magnetic memory, and any combinations thereof. Memory element 325 may include executable instructions (e.g., executable by processing element 305) that are consistent with executing one or more aspects and/or embodiments of the disclosure herein. Memory element 325 may also include stored data (e.g., tables including device model and scaling data, data representing scaling conversions, etc.) related to one or more lighting devices and/or one or more cameras, and/or other elements of operation of wireless functionality 300. Processing element 305 may utilize executable instructions and/or data included in memory element 325 to execute one or more aspects and/or embodiments of the disclosure herein (e.g., converting a power control value from one standard to another, identifying a camera model, identifying a lighting device model, identifying a power control standard of a lighting device, wirelessly communicating a power control value to a remote device, wirelessly receiving a power control value from a camera, and any combinations thereof).

Wireless functionality 300 may also include a power supply, a visual display, one or more input devices, and/or other elements related to the functions of a wireless communication functionality in the photographic field.

Figure 4:
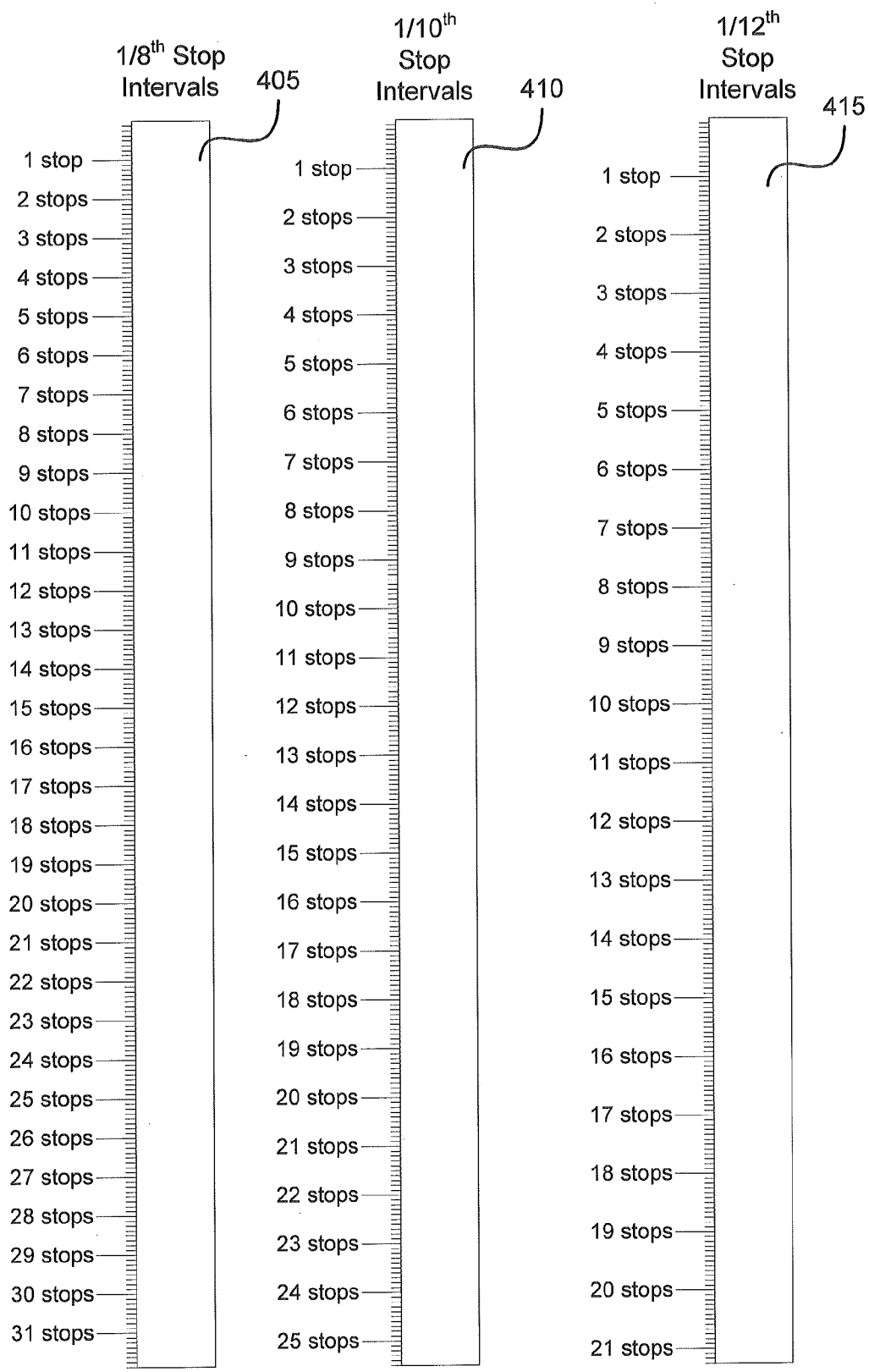
FIG. 4 illustrates three exemplary visual depictions of example power control value scaling.

FIG. 4 illustrates three exemplary visual depictions of example power control value scaling. Each of power control scales 405, 410, 415 utilize data values between 0 and 255 (e.g., 255 possible data values). Power control scaling 405 is based on f-stop intervals of ⅛ stops and includes a range of 31 f-stops (and multiple additional ⅛ intervals). Power control scaling 410 is based on f-stop intervals of 1/10 stops and includes a range of approximately 25 f-stops. Power control scaling 415 is based on f-stop intervals of 1/12 stops and includes a range of approximately 21 f-stops.

A power output range may vary from one lighting device to another. In one example, a power output range may include values ranging from the maximum power output of the lighting device to a minimum power output setting of the lighting device. In one such example, a power output range of a lighting device is 0 to −8, with the 0 being the maximum power setting and the −8 being the minimum power setting. In another example, a power output range of a lighting device is 0 to −10, with the 0 being the maximum power setting and the −10 being the minimum power setting. In another example, a power output range of a lighting device is 0.5 to 6.5 in 1/10 f-stop increments. The increments may be in any values. In one example, increments of a power range may be expressed in f-stops (and/or partial f-stops). In another example, increments of a power range may be expressed in arbitrary numbering scale. In yet another example, increments of a power range may be expressed in watts*seconds.

Now referring for exemplary purposes to FIG. 2 an example implementation will be discussed.

In one example, camera 210 generates a power control value based on ⅛ stop increments on a 0 to 255 scale having an initial scale value of X watt seconds. Wireless communication functionality 215 converts the power control value to a power control value based on a 1/10 stop increment scaling and adjusts for an offset to account for the initial value. In one such example, a conversion may include:

(Cx−Cos)*10/8=power control value for wireless transmission, where Cx is the data value for the power control value received from the camera and Cos is an offset to adjust for the initial value X to the scaling of the wireless transmission power control value.

In one such example, wireless communication functionality 215 may have detected the model of camera 210 via the hot shoe connection and utilized a table having model and scaling data to determine the 8/10 conversion factor.

Wireless communication functionality 215 wirelessly transmits the converted power control value to wireless communication functionalities 225 and 245. In this example, lighting device 220 utilizes a power value scale with 1/12 stop increments on a 0 to 255 scale to determine the amount of light to emit. In this example, lighting device 240 utilizes a power value scale with ⅛ stop increments on a 0 to 255 scale to determine the amount of light to emit. Wireless communication functionality 225 receives the power control value from wireless communication functionality 215 and knowing the scaling of lighting device 220 (e.g., via detecting the model and a lookup table) converts the received power control value to a power control value having based on the increment scaling of lighting device 220. In one such example, a conversion may include:

(Nx−Nos)*12/10=power control value for light device, where Nx is the data value received wirelessly and Nos is an offset to adjust for any starting power value of the lighting device needed to calibrate to the scaling of the wireless transmission.

Wireless communication functionality 245 receives the power control value from wireless communication functionality 215 and knowing the scaling of lighting device 240 (e.g., via detecting the model and a lookup table) converts the received power control value to a power control value based on the increment scaling of lighting device 240. In one such example, a conversion may include:

(Nx−Tos)*8/10=power control value for light device, where Nx is the data value received wirelessly and Tos is an offset to adjust for any starting power value of the lighting device needed to calibrate to the scaling of the wireless transmission.

In this example, the power settings of both lighting device 220 and 240 are set to the same effective power output such that they each emit light at approximately the same intended level. In an alternative implementation, multiple transmissions from a camera of power control values can be transmitted to different zones of one or more remote lighting devices to control different lighting output based on desired zone settings.

In another exemplary implementation, a lighting power control value may include information for setting the emission duration of a lighting device. In such a case, the lighting power control value may also include information for setting power output level.

In one example where this implementation may be useful, a camera may operate in a mode that sets the duration of a relatively constant light emission that begins prior to shutter opening and ends after shutter closure. This may occur when shutter speeds are fast enough to make synchronization of a light pulse with the full opening of the shutter difficult. Canon and Nikon cameras and flashes can be set to operate in such a mode known as HSS Synchronization mode and FP Synchronization mode, respectively.

In this exemplary implementation, a wireless communication functionality converts a power control value including a time duration value that is based on one time standard to another time duration value that is based on a second time standard for wireless communication to a remote lighting device. At the remote lighting device side, a wireless communication functionality converts the wirelessly received power control value to a standard that is compatible with the associated lighting device.

A variety of emission duration standards are contemplated. Example emission duration standards include, but are not limited to, a value based on a scaling of time values (e.g., each data integer represents a successive time duration value at a set interval of time), a value based on a mapping of time values (e.g., each data integer represents a different predetermined time duration value, such as from a lookup table), and any combinations thereof. In one example a time duration scaling standard may include data values from 0 to 255 with an interval between values if X seconds (e.g., an interval of 100 microseconds such that a data value of 1=100 microseconds, data value of 2=200 microseconds, 3=300 microseconds, . . . 255=25.5 milliseconds). In another example, a time duration standard may be based on tabular information where each data value (e.g., a hexadecimal value) represents a predetermined amount of light emission duration.

An exemplary implementation of a method of wirelessly communicating a power control value including a light emission duration value will now be described in relation to FIG. 2. In this example, camera 210 utilizes power control values having light emission duration information based on a predetermined mapping of hexadecimal values to predetermined light output durations as follows:

F=38.75 milliseconds
E=25.45 milliseconds
D=18.75 milliseconds
C=13.55 milliseconds
B=11.05 milliseconds
A=8.45 milliseconds
9=5.75 milliseconds Wireless communication functionality 215 receives a power control value from camera 210 that is based on this mapping. For example, a power control value including an emission duration value of "E" is received. In this example, wireless communication functionality 215 utilizes a standard based on a scaling having intervals of 100 microseconds between values from 0 to 255 for wireless transmission of a power control value having information related to emission duration. The offset of the scaling used for wireless communication has the "0" value on the scale equal to 1 millisecond. The power control value including the data value of "E" is converted to a wireless transmission scaling value of "245" on the scaling representing 25.5 milliseconds (some approximation is involved in this example to correlated the scaling to the tabular value for the camera). The power control value of "245" is wirelessly communicated to wireless communication functionality 225. Wireless communication functionality 225 converts the power control value of "245" to a power control value based on a standard that is compatible with lighting device 220. In one example, lighting device 220 utilizes a light emission value standard that is based on a scaling of values from 0 to 255 with 100 microsecond intervals. In one such example, the scaling has the same offset as the standard used for wireless communication (e.g., the conversion includes recognition of this and the power control value wirelessly received can be delivered to the power output control element of lighting device 220). In another such example, the scaling of the lighting device has a different offset from the standard used for wireless communication (e.g., the conversion includes an adjustment in data value to accommodate the difference in offset such that the time of light emission from lighting device 220 is the desired time). In another example, lighting device 220 utilizes a light emission value standard that is based on a different standard from that of the wireless communication (e.g., lighting device 220 uses a direct mapping, such as the direct mapping of camera 210). In such an example, wireless communication functionality 225 converts the wirelessly received power control value to a standard compatible with that of lighting device 220.

Throughout this disclosure, wireless communication functionality is discussed as the exemplary mechanism for converting a power control value from one standard to another wherever such a conversion is mentioned. It is contemplated that a conversion from one power control value standard to another may occur using one or more elements (e.g., memory, processing device, etc.) that are included in a wireless communication functionality, a camera, a lighting device, and any combination thereof. Likewise, receiving a power control value from a camera may be done utilizing one or more elements that are included in a wireless communication functionality and/or a camera.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of wirelessly communicating a photographic lighting power control value from a camera to one or more remote lighting devices, the method comprising:
   receiving a first lighting power control value based on a first standard at a first wireless communication functionality associated with a camera;
   converting the first lighting power control value to a second lighting power control value based on a second standard, said converting including reference to an index;
   wirelessly communicating the second lighting power control value from the first wireless communication functionality to a second wireless communication functionality associated with a first remote lighting device;
   converting the second lighting power control value to a third lighting power control value based on a third standard that is compatible with the power control of the first remote lighting device, said converting including reference to an index; and
   delivering the third lighting power control value to a power control processing element of the first remote lighting device.

2. A method according to claim 1, wherein any one or more of the first and second wireless communication functionalities identifies the power control standard of the device to which it is associated by a process including, but not limited to, being programmed to work with a specific device, knowing the device make by predetermined connection limitation, detecting the device make via an external connection, detecting the device model via an external connection, detecting the device make internally to the device, detecting the device model internally to the device, using a cross-over table, and any combinations thereof.

3. A method according to claim 1, wherein said converting the second lighting power control value includes use of an offset value.

4. A method according to claim 1, wherein the first, second, and third standards are different.

5. A method according to claim 1, wherein any two or more of the first, second, and third standards are the same.

6. A method according to claim 1, wherein the first and third standards are different.

7. A method according to claim 1, further comprising:
   recognizing at the first wireless communication functionality the first standard of the camera;
   referencing a memory having information for converting the first standard to the second standard for wireless communication.

8. A method according to claim 1, wherein the first, second, and third standards are based on an f-stop power scale.

9. A method according to claim 1, wherein the first, second, and third standards are based on a power output range.

10. A method according to claim 1, wherein the first, second, and third standards are based on a time duration value.

11. A method according to claim 1, wherein any one or more of the first wireless communication functionality and the second wireless communication functionality determines the power control standard of the device to which it is associated at a time prior to receiving a lighting power control value.

12. A method according to claim 1, further comprising emitting light from the first remote lighting device based on the third lighting control power value at a first power output level.

13. A method according to claim 1, further comprising:
wirelessly receiving the second lighting power control value at a third wireless communication functionality associated with a second remote lighting device;
converting the second lighting power control value to a fourth lighting power control value based on a fourth standard that is compatible with the power control of the second remote lighting device; and
delivering the fourth lighting power control value to a power control processing element of the second remote lighting device.

14. A method according to claim 13, wherein the third standard is the same as the fourth standard.

15. A method according to claim 13, wherein the third standard differs from the fourth standard.

16. A method according to claim 1, further comprising:
receiving a fourth lighting power control value based on the first standard at the first wireless communication functionality;
converting the fourth lighting power control value to a fifth lighting power control value based on a fourth standard;
wirelessly communicating the fifth lighting power control value from the first wireless communication functionality to a third wireless communication functionality associated with a second remote lighting device;
converting the fifth lighting power control value to a sixth lighting power control value based on a fifth standard that is compatible with the power control of the second remote lighting device; and
delivering the sixth lighting power control value to a power control processing element of the second remote lighting device.

17. A method according to claim 16, wherein the second standard and the fifth standard are the same.

18. A method according to claim 16, wherein the second standard and the fifth standard are different.

19. A method according to claim 16, further comprising:
emitting light from the first remote lighting device based on the third lighting control power value at a first power output level; and
emitting light from the second remote lighting device based on the sixth lighting control power value at a second power output level.

20. A method according to claim 19, wherein the first and second power output levels are different.

21. A method according to claim 1, wherein the first wireless communication functionality is at least in part internal to the camera.

22. A method according to claim 13, wherein the second lighting power control value includes different power settings for each of the first and second remote lighting devices.

23. A method according to claim 22, further comprising:
emitting light from the first remote lighting device based on the third lighting control power value at a first power output level; and
emitting light from the second remote lighting device based on the fourth lighting control power value at a second power output level.

24. A method according to claim 23, wherein the first and second power output levels are different.

25. A photographic wireless communication system comprising:

a transmitting wireless communication functionality associated with a camera including:
a memory including information for converting a first power control value standard of the camera to a second power control value standard for wireless communication to one or more remote lighting devices;
a processing element for receiving a first power control value based on the first power control value standard from the camera and using reference index information from the memory to convert the first power control value to a second power control value based on the second power control value standard; and
a wireless communication circuitry configured to wirelessly communicate the second power control value; and
a first receiving wireless communication functionality associated with a first remote lighting device including:
a wireless communication circuitry configured to wirelessly receive the second power control value;
a memory including information for converting the second power control value standard to a third power control value standard compatible with the first remote lighting device;
a connection to the power control circuitry of the first remote lighting device; and
a processing element for receiving the second power control value from the wireless communication circuitry, converting the second power control value to a third power control value based on the third power control value standard, and delivering the third power control value to the power control circuitry via the connection.

26. A system according to claim 25, wherein the first and third power control value standards are different.

27. A system according to claim 25, wherein the first and third power control value standards are the same.

28. A system according to claim 25, further comprising a second receiving wireless communication functionality associated with a second remote lighting device including:
a wireless communication circuitry configured to wirelessly receive the second power control value;
a memory including information for converting the second power control value standard to a fourth power control value standard compatible with the second remote lighting device;
a connection to the power control circuitry of the second remote lighting device; and
a processing element for receiving the second power control value from the wireless communication circuitry, converting the second power control value to a fourth power control value based on the fourth power control value standard, and delivering the fourth power control value to the power control circuitry of the second remote lighting device via the connection.

29. A method of wirelessly communicating a photographic lighting power control value from a camera to one or more remote lighting devices, the method comprising:
receiving a first lighting power control value based on a first standard at a first wireless communication functionality associated with a camera, the first standard based on an f-stop power scale;
converting the first lighting power control value to a second lighting power control value based on a second standard, the second standard based on an f-stop power scale;
wirelessly communicating the second lighting power control value from the first wireless communication functionality to a second wireless communication functionality associated with a first remote lighting device;
converting the second lighting power control value to a third lighting power control value based on a third standard that is compatible with the power control of the first remote lighting device, the third standard based on an f-stop power scale; and
delivering the third lighting power control value to a power control processing element of the first remote lighting device.

30. A method according to claim 29, wherein any one or more of the first and second wireless communication functionalities identifies the power control standard of the device to which it is associated by a process including, but not limited to, being programmed to work with a specific device, knowing the device make by predetermined connection limitation, detecting the device make via an external connection, detecting the device model via an external connection, detecting the device make internally to the device, detecting the device model internally to the device, using a cross-over table, and any combinations thereof.

31. A method according to claim 29, wherein said converting the second lighting power control value includes use of an offset value.

32. A method according to claim 29, wherein the first, second, and third standards are based on different f-stop power scales.

33. A method according to claim 29, wherein any two or more of the first, second, and third standards are based on the same f-stop power scales.

34. A method according to claim 29, wherein the first and third standards are based on different f-stop power scales.

35. A method according to claim 29, further comprising:
recognizing at the first wireless communication functionality the first standard of the camera;
referencing a memory having information for converting the first standard to the second standard for wireless communication.

36. A method according to claim 29, wherein any one or more of the first wireless communication functionality and the second wireless communication functionality determines the power control standard of the device to which it is associated at a time prior to receiving a lighting power control value.

37. A method according to claim 29, further comprising emitting light from the first remote lighting device based on the third lighting control power value at a first power output level.

38. A method according to claim 29, further comprising:
wirelessly receiving the second lighting power control value at a third wireless communication functionality associated with a second remote lighting device;
converting the second lighting power control value to a fourth lighting power control value based on a fourth standard that is compatible with the power control of the second remote lighting device; and
delivering the fourth lighting power control value to a power control processing element of the second remote lighting device.

39. A method according to claim 38, wherein the third standard is the same as the fourth standard.

40. A method according to claim 38, wherein the third standard differs from the fourth standard.

41. A method according to claim 29, further comprising:
receiving a fourth lighting power control value based on the first standard at the first wireless communication functionality;
converting the fourth lighting power control value to a fifth lighting power control value based on a fourth standard;
wirelessly communicating the fifth lighting power control value from the first wireless communication functionality to a third wireless communication functionality associated with a second remote lighting device;
converting the fifth lighting power control value to a sixth lighting power control value based on a fifth standard that is compatible with the power control of the second remote lighting device; and
delivering the sixth lighting power control value to a power control processing element of the second remote lighting device.

42. A method according to claim 41, wherein the second standard and the fifth standard are based on the same f-stop power scales.

43. A method according to claim 41, wherein the second standard and the fifth standard are based on different f-stop power scales.

44. A method according to claim 41, further comprising:
emitting light from the first remote lighting device based on the third lighting control power value at a first power output level; and
emitting light from the second remote lighting device based on the sixth lighting control power value at a second power output level.

45. A method according to claim 44, wherein the first and second power output levels are different.

46. A method according to claim 29, wherein the first wireless communication functionality is at least in part internal to the camera.

47. A photographic wireless communication system comprising:
a transmitting wireless communication functionality associated with a camera including:
a memory including information for converting a first power control value standard of the camera to a second power control value standard for wireless communication to one or more remote lighting devices, the first and second power control value standards each based on an f-stop power scale;
a processing element for receiving a first power control value based on the first power control value standard from the camera and using information from the memory to convert the first power control value to a second power control value based on the second power control value standard; and
a wireless communication circuitry configured to wirelessly communicate the second power control value; and
a first receiving wireless communication functionality associated with a first remote lighting device including:
a wireless communication circuitry configured to wirelessly receive the second power control value;
a memory including information for converting the second power control value standard to a third power control value standard compatible with the first remote lighting device;
a connection to the power control circuitry of the first remote lighting device; and
a processing element for receiving the second power control value from the wireless communication circuitry, converting the second power control value to a third power control value based on the third power control value standard, and delivering the third power control value to the power control circuitry via the connection, the third power control value standard based on an f-stop power scale.

48. A system according to claim 47, wherein the first and third power control value standards are based on different f-stop power scales.

49. A system according to claim 47, wherein the first and third power control value standards are based on the same f-stop power scales.

50. A system according to claim 47, further comprising a second receiving wireless communication functionality associated with a second remote lighting device including:
 a wireless communication circuitry configured to wirelessly receive the second power control value;
 a memory including information for converting the second power control value standard to a fourth power control value standard compatible with the second remote lighting device;
 a connection to the power control circuitry of the second remote lighting device; and
 a processing element for receiving the second power control value from the wireless communication circuitry, converting the second power control value to a fourth power control value based on the fourth power control value standard, and delivering the fourth power control value to the power control circuitry of the second remote lighting device via the connection.

51. A method of wirelessly communicating a photographic lighting power control value from a camera to one or more remote lighting devices, the method comprising:
 receiving a first lighting power control value based on a first standard at a first wireless communication functionality associated with a camera, the first standard based on a power output range;
 converting the first lighting power control value to a second lighting power control value based on a second standard, the second standard based on a power output range;
 wirelessly communicating the second lighting power control value from the first wireless communication functionality to a second wireless communication functionality associated with a first remote lighting device;
 converting the second lighting power control value to a third lighting power control value based on a third standard that is compatible with the power control of the first remote lighting device, the third standard based on a power output range; and
 delivering the third lighting power control value to a power control processing element of the first remote lighting device.

52. A method according to claim 51, wherein any one or more of the first and second wireless communication functionalities identifies the power control standard of the device to which it is associated by a process including, but not limited to, being programmed to work with a specific device, knowing the device make by predetermined connection limitation, detecting the device make via an external connection, detecting the device model via an external connection, detecting the device make internally to the device, detecting the device model internally to the device, using a cross-over table, and any combinations thereof.

53. A method according to claim 51, wherein said converting the second lighting power control value includes use of an offset value.

54. A method according to claim 51, wherein the first, second, and third standards are based on different power output ranges.

55. A method according to claim 51, wherein any two or more of the first, second, and third standards are based on the same power output ranges.

56. A method according to claim 51, wherein the first and third standards are based on different power output ranges.

57. A method according to claim 51, further comprising:
 recognizing at the first wireless communication functionality the first standard of the camera;
 referencing a memory having information for converting the first standard to the second standard for wireless communication.

58. A method according to claim 51, wherein any one or more of the first wireless communication functionality and the second wireless communication functionality determines the power control standard of the device to which it is associated at a time prior to receiving a lighting power control value.

59. A method according to claim 51, further comprising emitting light from the first remote lighting device based on the third lighting control power value at a first power output level.

60. A method according to claim 51, wherein the first wireless communication functionality is at least in part internal to the camera.

61. A photographic wireless communication system comprising:
 a transmitting wireless communication functionality associated with a camera including:
  a memory including information for converting a first power control value standard of the camera to a second power control value standard for wireless communication to one or more remote lighting devices, the first and second power control value standards each based on a power output range;
  a processing element for receiving a first power control value based on the first power control value standard from the camera and using information from the memory to convert the first power control value to a second power control value based on the second power control value standard; and
  a wireless communication circuitry configured to wirelessly communicate the second power control value; and
 a first receiving wireless communication functionality associated with a first remote lighting device including:
  a wireless communication circuitry configured to wirelessly receive the second power control value;
  a memory including information for converting the second power control value standard to a third power control value standard compatible with the first remote lighting device;
  a connection to the power control circuitry of the first remote lighting device; and
  a processing element for receiving the second power control value from the wireless communication circuitry, converting the second power control value to a third power control value based on the third power control value standard, and delivering the third power control value to the power control circuitry via the connection, the third power control value standard based on a power output range.

62. A system according to claim 61, wherein the first and third power control value standards are based on different power output ranges.

63. A system according to claim 61, wherein the first and third power control value standards are based on the same power output range.

64. A method of wirelessly communicating a photographic lighting power control value from a camera to one or more remote lighting devices, the method comprising:
- receiving a first lighting power control value based on a first standard at a first wireless communication functionality associated with a camera, the first standard based on a time duration value;
- converting the first lighting power control value to a second lighting power control value based on a second standard, the second standard based on a time duration value;
- wirelessly communicating the second lighting power control value from the first wireless communication functionality to a second wireless communication functionality associated with a first remote lighting device;
- converting the second lighting power control value to a third lighting power control value based on a third standard that is compatible with the power control of the first remote lighting device, the third standard based on a time duration value; and
- delivering the third lighting power control value to a power control processing element of the first remote lighting device.

65. A method according to claim 64, wherein any one or more of the first and second wireless communication functionalities identifies the power control standard of the device to which it is associated by a process including, but not limited to, being programmed to work with a specific device, knowing the device make by predetermined connection limitation, detecting the device make via an external connection, detecting the device model via an external connection, detecting the device make internally to the device, detecting the device model internally to the device, using a cross-over table, and any combinations thereof.

66. A method according to claim 64, wherein said converting the second lighting power control value includes use of an offset value.

67. A method according to claim 64, wherein the first, second, and third standards are different.

68. A method according to claim 64, wherein any two or more of the first, second, and third standards are the same.

69. A method according to claim 64, wherein the first and third standards are different.

70. A method according to claim 64, further comprising:
- recognizing at the first wireless communication functionality the first standard of the camera;
- referencing a memory having information for converting the first standard to the second standard for wireless communication.

71. A method according to claim 64, wherein any one or more of the first wireless communication functionality and the second wireless communication functionality determines the power control standard of the device to which it is associated at a time prior to receiving a lighting power control value.

72. A method according to claim 64, further comprising emitting light from the first remote lighting device based on the third lighting control power value at a first power output level.

73. A method according to claim 64, wherein the first wireless communication functionality is at least in part internal to the camera.

74. A photographic wireless communication system comprising:
- a transmitting wireless communication functionality associated with a camera including:
  - a memory including information for converting a first power control value standard of the camera to a second power control value standard for wireless communication to one or more remote lighting devices, the first and second power control value standards each based on a time duration value;
  - a processing element for receiving a first power control value based on the first power control value standard from the camera and using information from the memory to convert the first power control value to a second power control value based on the second power control value standard; and
  - a wireless communication circuitry configured to wirelessly communicate the second power control value; and
- a first receiving wireless communication functionality associated with a first remote lighting device including:
  - a wireless communication circuitry configured to wirelessly receive the second power control value;
  - a memory including information for converting the second power control value standard to a third power control value standard compatible with the first remote lighting device;
  - a connection to the power control circuitry of the first remote lighting device; and
  - a processing element for receiving the second power control value from the wireless communication circuitry, converting the second power control value to a third power control value based on the third power control value standard, and delivering the third power control value to the power control circuitry via the connection, the third power control value standard based on a time duration value.

75. A system according to claim 74, wherein the first and third power control value standards are different.

76. A system according to claim 74, wherein the first and third power control value standards are the same.

* * * * *